United States Patent [19]

Jacobs et al.

[11] Patent Number: 5,539,794
[45] Date of Patent: Jul. 23, 1996

[54] REDUCTION OF MANGANESE CONTENT OF STAINLESS ALLOYS TO MITIGATE CORROSION OF NEIGHBORING IN-CORE ZIRCONIUM BASED COMPONENTS

[75] Inventors: Alvin J. Jacobs, San Jose; Gerald M. Gordon, Soquel; Richard A. Proebstle, San Jose; Mickey O. Marlowe; Ronald B. Adamson, both of Fremont, all of Calif.

[73] Assignee: General Electric Company, San Jose, Calif.

[21] Appl. No.: 305,504

[22] Filed: Sep. 13, 1994

Related U.S. Application Data

[63] Continuation of Ser. No. 60,628, May 13, 1993, abandoned.

[51] Int. Cl.$^6$ .................................................. G21C 5/00
[52] U.S. Cl. ........................... 376/277; 420/43; 420/452; 420/584.1; 420/422; 376/900
[58] Field of Search .............................. 376/900; 420/43, 420/452, 584.1, 422

[56] References Cited

U.S. PATENT DOCUMENTS

| 4,231,795 | 11/1980 | Gibson et al. | 376/900 |
| 4,512,819 | 4/1985 | Steinberg | 376/900 |
| 4,798,633 | 1/1989 | Martin et al. | 376/900 |
| 5,120,614 | 6/1992 | Hibner et al. | 420/584.1 |
| 5,196,163 | 3/1993 | Matsuo et al. | 376/900 |

FOREIGN PATENT DOCUMENTS

| 59-143049 | 8/1984 | Japan | 420/43 |
| 59-153858 | 9/1984 | Japan | 420/584.1 |
| 1023159 | 3/1966 | United Kingdom | 420/584.1 |
| 1210064 | 10/1970 | United Kingdom | 420/43 |

*Primary Examiner*—Deborah Yee
*Attorney, Agent, or Firm*—James E. McGinness

[57] ABSTRACT

An improved stainless steel composition and an improved stainless Ni-based alloy are disclosed for use in nuclear reactor environments. The improved stainless alloys include a stainless steel and a stainless nickel based alloy that are particularly well adapted for use in reactor components that are positioned adjacent to components formed from a zirconium based metal. The improved stainless steel is an austenitic stainless steel material that include less than approximately 0.2 percent manganese by weight, but does include sufficient austenitic stabilizer to prevent a martensitic transformation during fabrication or use in a reactor environment. In one preferred embodiment, the stainless alloy is formed without any significant amount of manganese.

8 Claims, 1 Drawing Sheet

REDUCTION OF MANGANESE CONTENT OF STAINLESS ALLOYS TO MITIGATE CORROSION OF NEIGHBORING IN-CORE ZIRCONIUM BASED COMPONENTS

This is a continuation of application Ser. No. 08/060,628 filed on May 13, 1993, now abandoned.

BACKGROUND OF THE INVENTION

The present invention relates generally to improving the corrosion resistance of zirconium alloy based components in nuclear reactor environments. More particularly, improved stainless alloy compositions are disclosed that reduce the shadow corrosion effect occasionally observed in zirconium alloy components positioned adjacent to stainless components in nuclear reactors.

Corrosion studies of components used in environments subjected to nuclear irradiation have shown enhanced corrosion in various zirconium alloy based components that are positioned adjacent to certain stainless steel, platinum, copper, hafnium and yttrium based components. This enhanced corrosion is manifested by a so-called "shadow effect" that takes the form of a region of enhanced corrosion in the zirconium component that occurs immediately adjacent to the shadowing component. In some cases, the enhanced corrosion can potentially limit the useful life of the zirconium alloy based component. The applicants have determined that there is considerable evidence that a constituent of the "shadowing" material becomes activated and that beta particles emitted by the activated shadowing component are the cause of this increased corrosion (i.e. shadow effect corrosion). This observation has been confirmed, for example, by Lemaignan in his article entitled "Impact of β-Radiolysis and Transient Products on Radiation-Enhanced Corrosion of Zirconium Alloys", Journal of Nuclear Material, Vol. 187 1992 p. 122–130. Two possible mechanisms by which beta particles can cause increased corrosion are the production of irradiation damage in the oxide present on the surface of the zirconium alloy component, and the production of local transient radiolytic species in the coolant water.

In boiling water reactors, stainless steel is used in many core components. Thus, the applicants have observed shadow effect corrosion in several components. It is therefore an object of the present invention to eliminate or at least reduce the shadow effect caused in zirconium based components that are situated adjacent to stainless alloy components within a nuclear reactor.

SUMMARY OF THE INVENTION

To achieve the foregoing and other objects and in accordance with the purpose of the present invention, an improved stainless alloy composition for use in nuclear reactor environments is disclosed. The improved stainless alloy is particularly well adapted for use in reactor components that are positioned adjacent to a zirconium based metal. In one embodiment, the improved stainless alloy is an austenitic stainless steel material that has a very low (up to approximately 0.2%) concentration of manganese but does include sufficient austenitic stabilizer to prevent a martensitic transformation during fabrication or use in a reactor environment. In a preferred embodiment, the stainless steel does not include any significant amount of manganese. In another preferred embodiment, the stainless steel is a 300 series austenitic stainless steel.

In an alternative preferred embodiment, the stainless alloy is a stainless nickel based alloy that has a very low (up to approximately 0.1%) concentration of manganese.

The stainless alloys may advantageously be used in a variety of components including control rod bail handles, control rod poison curtains, instrument tubes, guide tubes, spacer component parts, tie plates and grids. The invention is particularly helpful when the stainless alloy component is positioned adjacent to a component formed from a zirconium alloy material such as Zircaloy metal. Representative components that may be protected by using the improved stainless steel in boiling water reactors include Zircaloy channels, Zircaloy fuel claddings, and Zircaloy fuel rod end plugs.

BRIEF DESCRIPTION OF THE DRAWINGS

The invention, together with further objects and advantages thereof, may best be understood by reference to the following description taken in conjunction with the accompanying drawing in which.

DETAILED DESCRIPTION OF THE INVENTION

Figure 1:
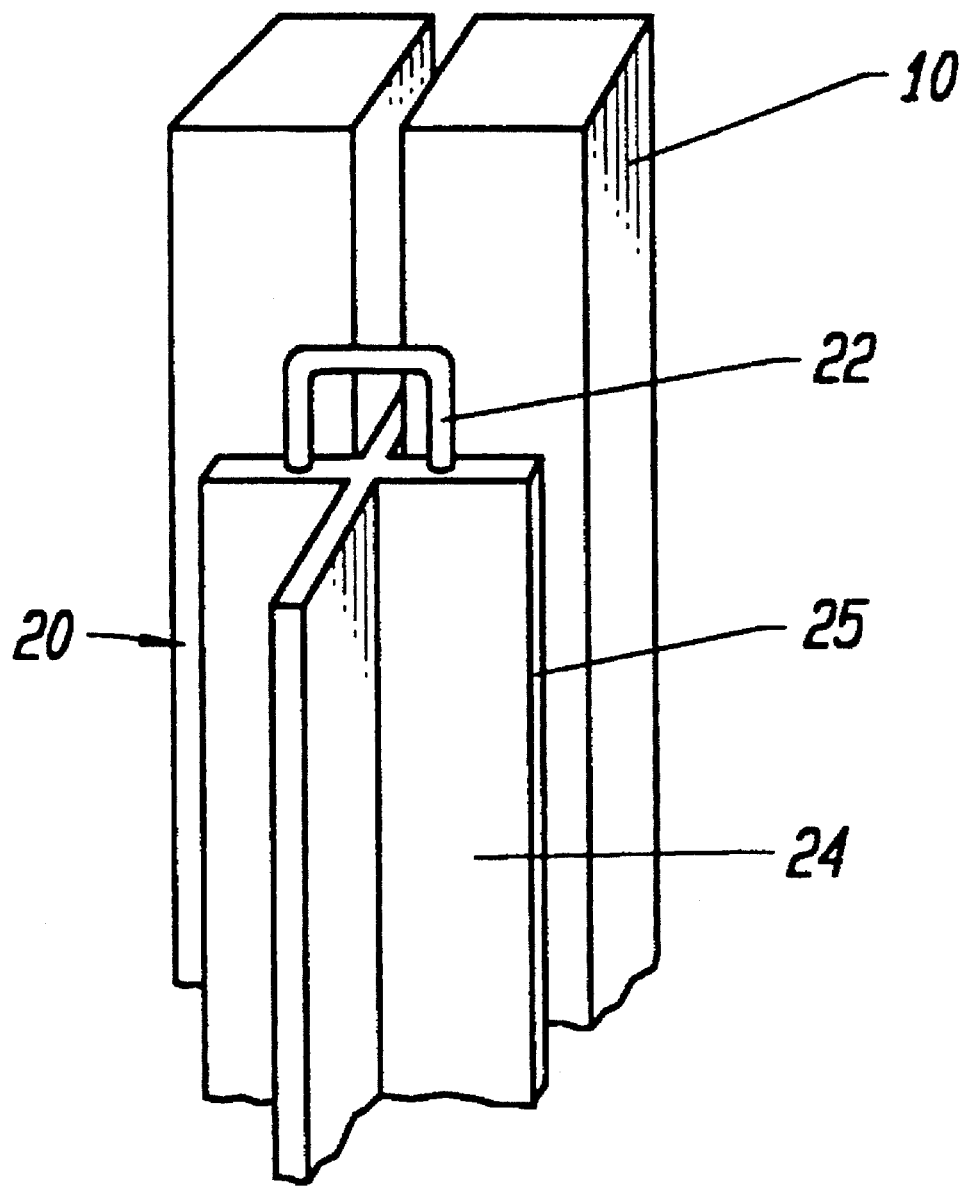
FIG. 1 is a diagrammatic perspective view showing the relative positioning of a control rod and its adjacent fuel channels.

The primary emitter of beta particles in stainless steel is the manganese-56 component thereof (Mn-56). The 300-series austenitic stainless steels that are commonly used in boiling water reactors may contain up to two percent by weight of manganese. In such stainless steels, more than 90% of the emitted beta particles originate from the Mn-56 component. The beta particles emitted from Mn-56 have an energy level of 2.85 MeV, which is relatively high. Therefore, it has been postulated that shadow corrosion can be reduced by reducing the Mn-56 content of the stainless steel used within the active portion of a nuclear reactor.

However, the applicant's studies have shown that if manganese is simply removed from certain stainless steels that are used in components that are subjected to a high irradiation fluence, the stress corrosion resistance of the stainless steel components may decrease dramatically. This is due to the fact that the manganese acts as an austenite stabilizer. Therefore, the elimination of manganese increases the probability that at least a portion of the stainless steel will undergo a martensitic transformation. The applicant's studies have shown that after a martensitic transformation occurs, the stress corrosion resistance of irradiated stainless steel drops significantly. This result is illustrated in the tests results set forth below in tables 1–3.

Specifically, Table 1 defines the constituents of the stainless steel used in the tests. The first stainless steel, which is designated as a high purity 304 stainless steel (HP 304) did not include any manganese. The second stainless steel, which is designated as commercial purity 304 stainless steel (CP 304), included 1.77% manganese. The third stainless steel, which is designated as high purity 348 stainless steel (HP 348), did not include any manganese, while the fourth stainless steel designated as commercial purity 348 stainless steel (CP 348) included 1.67% manganese.

Each of these components was placed in an active reactor for a period of time where they were exposed to substantial irradiation, the amount of which is indicated in column 2 of Table 2. After the radiation exposure, the materials were tested to determine their strength and corrosion characteristics. The results of a constant extension rate tensile test are shown in Table 2. The results of a tensile test are shown in Table 3. As seen in Table 2, in a constant extension rate tensile test, the manganese-free 304 stainless steel (i.e. HP 304) was much more brittle than the CP 304. As seen in Table 3, under a tensile test, the strength of the HP 304 was somewhat more than CP 304, but its ductility was substantially worse. More importantly, as seen in the last column of Table 2, an analysis of the metal showed approximately 95% intergranular stress corrosion cracking (IGSCC) in HP 304, while CP 304 has only 50% IGSCC. This shows that HP 304 is much more prone to IGSCC.

TABLE 1

| | Composition, Wt % | | | | | | | | | | | |
|---|---|---|---|---|---|---|---|---|---|---|---|---|
| Material | C | Cr | Ni | P | Si | S | N | Mn | Nb | Ta | B | Mo |
| HP304 | 0.013 | 17.3 | 8.49 | 0.004 | 0.004* | 0.004* | 0.037 | 0.0 | ND | ND | ND | ND |
| CP304 | 0.027 | 18.26 | 9.35 | 0.029 | 0.38 | 0.025 | ND | 1.77 | ND | ND | ND | 0.35 |
| HP348 | 0.08 | 18 | 12 | 0.0035 | 0.0065 | 0.003 | ND | 0.0 | 0.8 | ND | 0.0016 | ND |
| CP348 | 0.051 | 17.35 | 10.98 | 0.01 | 0.06 | ** | ND | 1.67 | 0.73 | 0.014 | <0.001 | ND |

ND — Not determined
*Nominal — not analyzed
**0.014–0.094

TABLE 2

| | CERT Test Results | | | | |
|---|---|---|---|---|---|
| Material | Fluence (×10^21 n/cm^2) | Time-to-Failure (hrs.) | Max. Stress (ksi) | % Elongation | Failure Mode |
| HP304 | 2.55 | 12 | 20.8 | 1 | 95% IGSCC, bal. ductile |
| CP304 | 2.59 | 119 | 47.7 | 5.9 | 50% IGSCC/TGSCC, bal. ductile |
| HP348 | 2.23 | 55 | 48.4 | 4.5 | 50% IGSCC, bal. ductile |
| CP348 | 2.41 | 23 | 53.7 | 1.8 | 40% IGSCC, bal. ductile |

TABLE 3

| | Tensile Test Results | | | | |
|---|---|---|---|---|---|
| Material | Fluence (×10^21 n/cm^2) | 0.2% YS (ksi) | UTS (ksi) | % Elongation | % RA |
| HP304 | 2.55 | 98.4 | 102.7 | 8.2 | 16.7 |
| CP304 | 2.59 | 73.6 | 80.3 | 25.6 | 35 |
| HP348 | 2.23 | 63.8 | 63.8 | 10.7 | 69.7 |
| CP348 | 2.41 | 72.8 | 84.4 | 4.3 | 39.7 |

The reduced stress corrosion resistance (i.e. the increased intergranular stress corrosion cracking) that was observed in the HP 304 stainless steel is attributable to a martensitic transformation that occurs when the manganese is eliminated. In contrast, martensite did not form in the HP 348 steel. As can be seen from Tables 2 and 3, the differences in intergranular stress corrosion cracking between CP 348 and HP 348 was relatively small and within the experimental error of the tests conducted. Therefore, in order to maintain the stress corrosion resistance of stainless steel, while reducing the shadow effect corrosion caused by the stainless steel's manganese component, it is important to ensure that the stainless steel does not undergo a martensitic transformation either during fabrication of the metal or during use in an irradiated environment. This can be accomplished by adding compensatory amounts of other conventional austenite stabilizers such as nickel, carbon and/or nitrogen to the stainless steel.

As is well known to those skilled in the stainless steel metallurgy arts, when manganese is eliminated (or reduced), the appropriate compensatory amount of nickel, carbon or nitrogen can be determined by calculating the nickel equivalent using the formula:

Nickel equivalent=%Ni+(30×%C)+(30×%N)+(0.5×%Mn)

This formula appears in the constitution diagram for austenite stainless steel weld metal (AMSE Code, Section III. Thus, by adjusting the additional amounts of nickel, carbon and nitrogen, it is possible to compensate for the manganese that is eliminated. Further, by judicious selection of these additives, it would be possible to minimize the average thermal neutron cross section of the manganese-free steel, which would provide additional benefits.

In practice, the shadow effect has been observed in a number of zirconium-based components that are positioned adjacent to stainless steel components. By way of example, as seen in FIG. 1, Zircaloy fuel channels 10 have been observed to exhibit shadow effect corrosion due to the influence of an adjacent stainless steel bail handle 22 of control rod 20. In a representative reactor, a typical positioning of the control rod 20 relative to the channels 10 is shown in FIG. 1. A representative distance between the bail handle 22 and the channel is a quarter of an inch.

Other stainless steel components that are known to affect Zircaloy channels include the stainless steel poison curtains 24 located on the control rod blade 25, the instrument tubes and the upper grid. Similarly, the stainless steel lower tie plate has been observed to induce shadow effect corrosion on the end plug threads of the fuel rods, while stainless steel spacer components, such as spacer sidebands, have also caused shadow effect corrosion on the Zircaloy claddings on fuel rods. In accordance with the present invention, each of these components may be made from an austenite-stabilized manganese-free stainless steel or stainless steel with its manganese content reduced to less than approximately 0.2% by weight.

Nickel-based stainless alloys are also commonly used in various reactor components. Since Ni-based stainless alloys also traditionally have a significant amount of manganese therein, they can also induce a similar shadow effect corrosion. Accordingly, in an alternative embodiment of the invention manganese-free Ni-based stainless alloys or a Ni-based alloy with its manganese content reduced to less than approximately 0.1% by weight may be used to fabricate various reactor parts However, in Ni-based stainless alloys, martensite formation is not a concern even when the manganese content is reduced. This is due to the high amounts of Ni present and the consequent high degree of austenite stability. Therefore, in Ni-based stainless alloys, there is no need to add compensatory amounts of austenite stabilizers.

Although only a few specific components that are conventionally made from stainless steel have been identified, it should be appreciated that the present invention applies equally well to any other reactor component that is made from stainless steel or Ni-based stainless alloys. Further, in the described embodiment, Zircaloy components exhibit the shadow effect corrosion. However, in alternative embodiments, the neighboring components may be made of any zirconium-based metals or any other material that exhibits enhanced corrosion due to exposure to beta particles. Therefore, the present examples are to be considered as illustrative and not restrictive, and the invention may be modified within the scope of the appended claims.

We claim:

1. An arrangement of components inside a nuclear reactor, comprising a first component made of nickel-based austenitic stainless alloy having a composition which includes an amount of manganese less than approximately 0.1% by weight and a second component made of a zirconium-based alloy, wherein said first component is installed inside said nuclear reactor at a position adjacent to said second component, and said first and second components are separated by a distance which is equal to or less than the range in water of beta particles emitted by the manganese-56 isotope.

2. The component arrangement as defined in claim 1, wherein said first component is selected from the group consisting of a control rod bail handle, a control rod poison curtain, an instrument tube, a guide tube, a spacer component part, a tie plate and a grid.

3. The component arrangement as defined in claim 1, wherein said second component is a fuel channel.

4. An arrangement of components inside a nuclear reactor, comprising a first component made of austenitic stainless steel alloy having a composition which includes less than approximately 0.2% manganese by weight and an amount of austenite stabilizer sufficient to prevent a transformation from austenite to martensite during fabrication or use in an irradiated environment, and a second component made of a zirconium-based alloy, wherein said first component is installed inside said nuclear reactor at a position adjacent to said second component, and said first and second components are separated by a distance which is equal to or less than the range in water of beta particles emitted by the manganese-56 isotope.

5. The component arrangement as defined in claim 4, wherein said first component is selected from the group consisting of a control rod bail handle, a control rod poison curtain, an instrument tube, a guide tube, a spacer component part, a tie plate and a grid.

6. The component arrangement as defined in claim 4, wherein said second component is a fuel channel.

7. The component arrangement as defined in claim 2, wherein said second component is a fuel channel.

8. The component arrangement as defined in claim 5, wherein said second component is a fuel channel.

* * * * *